United States Patent
Persson et al.

(10) Patent No.: US 9,921,293 B2
(45) Date of Patent: Mar. 20, 2018

(54) SYSTEM AND METHOD FOR LOCATION ESTIMATION IN ENVIRONMENTS UNSUITABLE FOR GPS TECHNOLOGY

(75) Inventors: Magnus Persson, Flyinge (SE); David Karlsson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 884 days.

(21) Appl. No.: 13/389,297

(22) PCT Filed: Dec. 16, 2010

(86) PCT No.: PCT/EP2010/069928
§ 371 (c)(1),
(2), (4) Date: Feb. 7, 2012

(87) PCT Pub. No.: WO2012/079638
PCT Pub. Date: Jun. 21, 2012

(65) Prior Publication Data
US 2012/0280863 A1  Nov. 8, 2012

(51) Int. Cl.
*G01S 5/14* (2006.01)
*G01S 11/06* (2006.01)
*G01S 13/82* (2006.01)
*G01S 5/02* (2010.01)

(52) U.S. Cl.
CPC .............. *G01S 5/14* (2013.01); *G01S 5/0205* (2013.01); *G01S 11/06* (2013.01); *G01S 13/82* (2013.01)

(58) Field of Classification Search
CPC ... G01S 5/14; G01S 1/68; G01S 11/06; G01S 5/0205; G01S 13/82; G01S 5/0009; G01S 1/685; G01S 5/0252

USPC ......................................... 342/386, 458, 463
See application file for complete search history.

(56) References Cited

U.S. PATENT DOCUMENTS

| | | | |
|---|---|---|---|
| 5,999,126 A * | 12/1999 | Ito ........................ | G01C 21/28 342/357.25 |
| 6,424,831 B1 * | 7/2002 | Schiff ........................... | 455/429 |
| 6,519,464 B1 * | 2/2003 | Santhoff et al. ........... | 455/456.5 |
| 2002/0077124 A1 * | 6/2002 | Hunzinger ............ | H04W 64/00 455/456.6 |
| 2003/0134647 A1 * | 7/2003 | Santhoff et al. .............. | 455/456 |

(Continued)

FOREIGN PATENT DOCUMENTS

EP         1 206 152 A2     5/2002
WO    WO 0197547 A1  *  12/2001
(Continued)

OTHER PUBLICATIONS

International Search Report, corresponding to PCT/EP2010/069928, dated Aug. 23, 2011.
(Continued)

*Primary Examiner* — Bernarr E Gregory
*Assistant Examiner* — Fred H Mull
(74) *Attorney, Agent, or Firm* — Renner, Otto, Boisselle & Sklar, LLP

(57) ABSTRACT

A device and method for providing location estimations. The device may be configured to estimate its location by transmitting and/or receiving signals of respective transmission ranges. The device may also be configured to transition from a client device operational mode to a location beacon operational mode once an accurate location estimation has been obtained.

14 Claims, 5 Drawing Sheets

(56) References Cited

U.S. PATENT DOCUMENTS

| | | | |
|---|---|---|---|
| 2008/0009305 A1* | 1/2008 | Li et al. | 455/522 |
| 2008/0238661 A1* | 10/2008 | Camp et al. | 340/539.21 |
| 2009/0061899 A1* | 3/2009 | Hwang | G01S 5/0018 455/456.2 |
| 2009/0128412 A1* | 5/2009 | Ryu et al. | 342/463 |
| 2009/0311963 A1* | 12/2009 | Haverty | 455/63.1 |
| 2010/0054139 A1* | 3/2010 | Chun | H04L 1/1678 370/252 |
| 2010/0066503 A1* | 3/2010 | Rhie | G01S 1/68 340/10.1 |
| 2010/0121567 A1* | 5/2010 | Mendelson | G01S 1/68 701/467 |
| 2010/0271186 A1* | 10/2010 | Tanaka | G01S 5/14 340/10.3 |
| 2011/0171974 A1* | 7/2011 | Kim et al. | 455/456.2 |
| 2011/0269478 A1* | 11/2011 | Das | G01S 5/14 455/456.1 |
| 2013/0162481 A1* | 6/2013 | Parvizi et al. | 342/452 |

FOREIGN PATENT DOCUMENTS

| | | | | |
|---|---|---|---|---|
| WO | WO 2008/143483 A1 * | 11/2008 | | G01S 1/68 |
| WO | 2010/107821 A1 | 9/2010 | | |

OTHER PUBLICATIONS

Written Opinion of the International Searching Authority, corresponding to PCT/EP2010/069928, dated Aug. 23, 2011.

* cited by examiner

SYSTEM AND METHOD FOR LOCATION ESTIMATION IN ENVIRONMENTS UNSUITABLE FOR GPS TECHNOLOGY

TECHNICAL FIELD

Example embodiments presented herein relate to location estimation.

BACKGROUND

Location beacons (also known as distress radio beacons, location transmitters, personal locator beacons or emergency beacons) are tracking transmitters which aid in the detection and location of boats, aircraft, or people. In telecommunication systems including one or more mobile terminals, such as a portable electronic communication device, the ability to determine the location of such a terminal can be of benefit with respect to the operation and the functionality of the system. Information relating to the location of the mobile terminal allows operational parameters to be adjusted for optimising performance and the use of resources.

Location beacon technology may employ a Global Positioning System (GPS). GPS is a space-based system that provides reliable location and time information where there is an unobstructed line of sight to GPS satellites.

SUMMARY

While GPS based systems may be used as an effective tool for location estimation, problems arise in environments which are prone to weak satellite signals (e.g., indoor and/or underground environments).

Thus, an example object of the embodiments presented herein is to provide an improved method of location estimations, for example to provide location estimations in environments which are unsuitable for GPS technology.

This object may be achieved by a method for location estimation which may comprise receiving at least one signal from a location beacon. The at least one signal may comprise an identification of the location beacon, a power level, and/or a respective maximum power range of the at least one signal. The method may also comprise estimating a current location of a client device based on the received at least one signal.

In some example embodiments, the method may comprise transmitting a plurality of location request signals. Each location request signal may comprise an identification of the client device, a distinct transmitted power level (i.e., the transmitted power level of each signal may be different from the power level of at least one other transmitted signal), and/or a respective maximum power range. The received at least one signal may be an echo signal that may be provided as a function of the plurality of location request signals. Estimating the current location of the client device may further comprise evaluating the plurality of request signals with respect to received at least one echo signal.

In some example embodiments, the at least one signal may be an estimation signal that may be proactively provided by the location beacon.

In some example embodiments, the method may comprise transitioning an operational mode of the client device such that the client device may function as a location beacon once the estimated current location of the client device has reached a predetermined level of accuracy.

In some example embodiments, the method may comprise determining the predetermined level of accuracy based on a period of non-mobility, a type of power source, and/or a known location.

In some example embodiments, at least one of the steps of transmitting, receiving, and estimating may take place in an indoor environment.

In some example embodiments, the method may comprise compiling or updating a mapping of at least one surrounding device as a function of the estimating.

Some example embodiments may be directed towards a computer readable storage medium encoded with computer executable instructions, wherein the instructions, when executed by a location beacon device, may perform any one of the method steps described above.

Some example embodiments may be directed towards a location estimation unit which may comprise a receiver. The receiver may be configured to receive at least one signal from a location beacon. The at least one signal may comprise an identification of the location beacon, a received power level, and/or a respective maximum power range of the at least one signal. The unit may also comprise an estimator that may be configured to estimate a current location of a client device based on the received at least one estimation signal.

In some example embodiments the unit may comprise a transmitter that may be configured to transmit a plurality of location request signals, each request signal may comprise an identification of the client device, a distinct transmitted power level, and/or a respective maximum power range. The at least one signal may be an echo signal and may be provided as a function of the plurality of location request signals. The estimator may further be configured to evaluate the plurality of location request signals with respect to received at least one echo signal.

In some example embodiments, the unit may further be configured to transition to a location beacon operational mode from a client device operational mode when the location unit has reached a predetermined level of accuracy.

In some example embodiments, the unit may be configured to determine the predetermined level of accuracy based on a period of non-mobility, a type of power source, and/or a known location.

In some example embodiments, the unit is located in an indoor environment.

In some example embodiments, the estimator may be configured to create a mapping of at least one surrounding device as a function of the estimated current location.

In some example embodiments, the unit may be a component of a BLUETOOTH® wireless technology or Wi-Fi device.

In some example embodiments, the unit may be a component of a multimedia device.

In some example embodiments, the unit may be a component of a mobile phone or computer.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Example embodiments presented herein provide accurate location estimation in environments which may be unsuitable for GPS systems. Examples of such environments may be an indoor environment (e.g., inside a building) or an underground environment (e.g., a subway system). It should be appreciated that these environments are provided merely as an example and that the example embodiments presented herein may be used in any other environment where a location is to be estimated.

Location Estimation Unit

Figure 1:
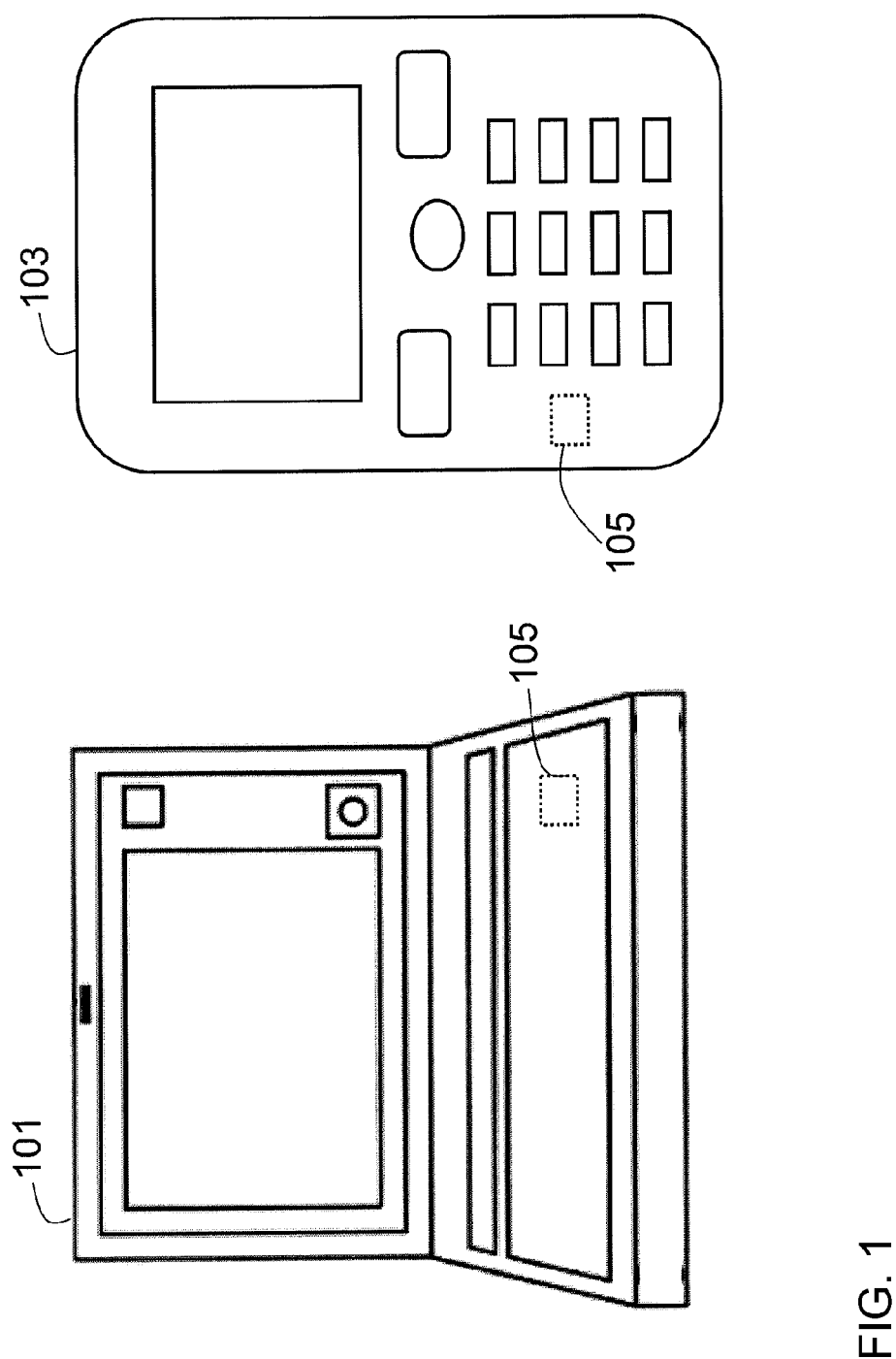
FIG. 1 is an illustrative example of multimedia devices which may comprise some of the example embodiments presented herein.

FIG. 1 provides an example of devices which may employ location estimation according to the example embodiments presented herein. FIG. 1 depicts a laptop computer 101 and a mobile telephone 103. Both the computer 101 and telephone 103 comprise a location estimation unit 105. It should be appreciated that while FIG. 1 only depicts a computer and mobile telephone, any other type of multimedia or tracking device may employ a location estimation unit 105. It should further be appreciated that the location estimation unit 105 may be located in both a location beacon (i.e., a device that has knowledge of this own location and aids in the location estimation of other devices) and a client device (i.e., a device which does not have accurate knowledge of its location).

Figure 2:
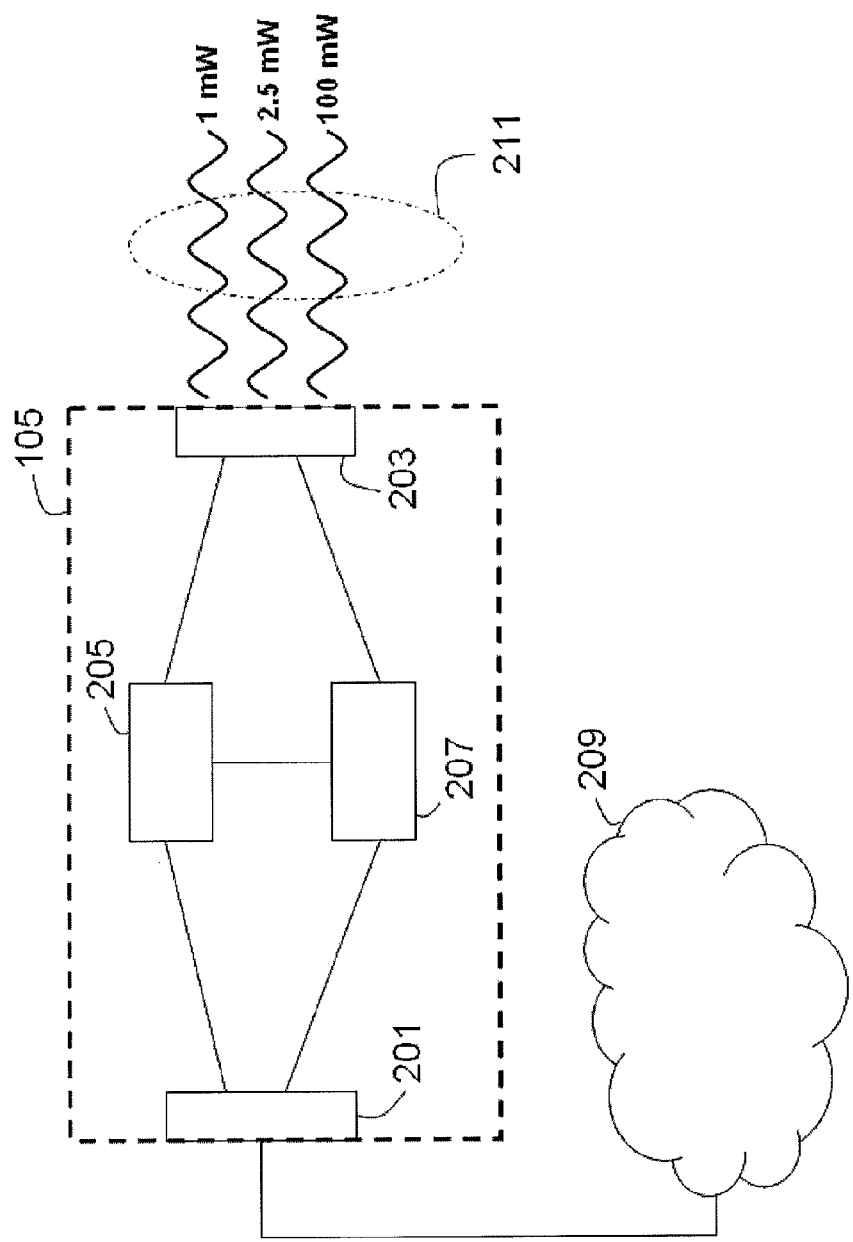
FIG. 2 is a schematic of a location estimation unit, according to some of the example embodiments presented herein.

FIG. 2 is a schematic drawing of the location estimation unit 105 of FIG. 1. The location estimation unit 105 may comprise a receiver 201 and a transmitter 203, which may be able to transmit or receive any number or type of signals 211. It should be appreciated that the location estimation unit 105 may alternatively comprise a single transceiver port. It should further be appreciated that the receiver, transmitter, or transceiver port may be in the form of any input/output communications port known in the art. It should also be appreciated that the receiver 201 and/or transmitter 203 may be in communication with at least one network or server 209. The location estimation unit 105 may send to and/or retrieve from the network or server 209 location mapping or location history data.

The location estimation unit 105 may further comprise at least one memory unit 205 that may be in communication with the receiver 201 and/or transmitter 203. The memory unit 205 may be configured to store received, transmitted, and/or measured data and/or executable program instructions. The memory unit 205 may be further configured to store a mapping featuring the locations of nearby devices, as well as a location history for the current device and nearby devices. The memory unit 205 may be any suitable type of computer readable memory and may be of volatile and/or non-volatile type.

The location estimation unit 105 may further comprise a processing unit 207. The processing unit may be any suitable type of computation unit, e.g. a microprocessor, digital signal processor (DSP), field programmable gate array (FPGA), or application specific integrated circuit (ASIC).

Figure 3:
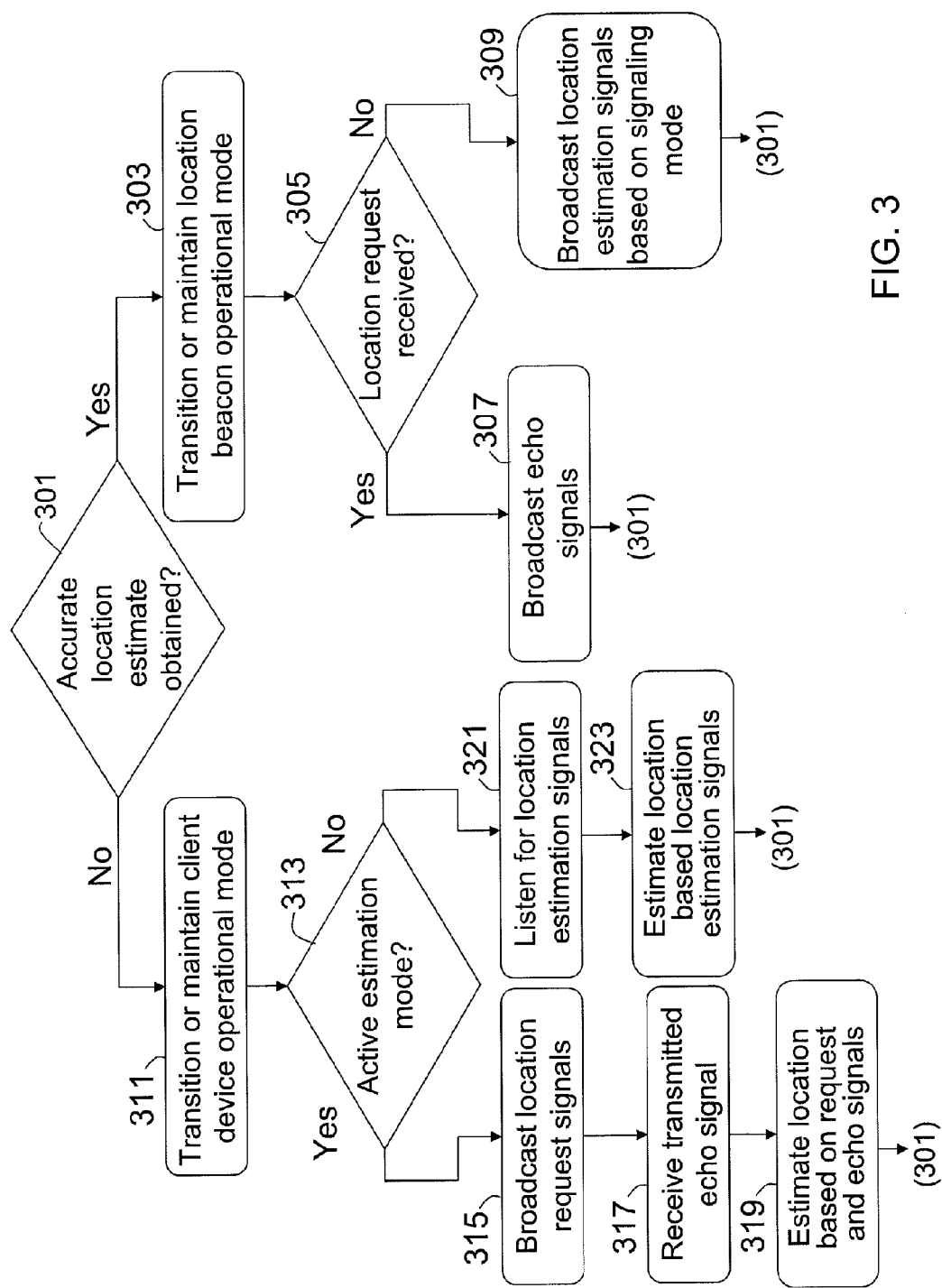
FIG. 3 is a flow diagram depicting example operational actions which may be taken by the component of FIG. 2, according to some of the example embodiments presented herein.

FIG. 3 is a flow diagram depicting example operational steps which may be taken by the location estimation unit 105 of FIG. 2. It should be appreciated that a device comprising the location estimation unit 105 may be operable as a location beacon or as a client device. Thus, in deciding between a client device or location beacon mode of operation, the location estimation unit 105 may be configured to make a determination if an accurate location estimate has been obtained (301).

Location Estimation Unit as a Location Beacon

In determining if an accurate location estimate has been obtained the location estimation unit 105 may be configured to consider a number of parameters. For example, the mobility of the device may be monitored. Therefore, if a device experiences a long period of non-mobility where the estimated location of the device is the same, the operational mode of the location estimation unit may be transitioned to or maintained as a location beacon (303). It should be appreciated that a period of non-mobility may be determined with the use of a programmable threshold. For example, if a device has the same estimated location for 30 minutes, the operational mode may be transitioned to or maintained as a location beacon.

It should further be appreciated that the estimated location during the period of non-mobility need not be the same. For example, the estimated location may be within a predetermined range (e.g., within a 1 meter radius of the transmitting device) during the evaluated period of non-mobility.

It should further be appreciated that other parameters besides mobility may be evaluated. For example, if the device is plugged into a power supply, the location estimation unit 105 may assume a period of non-mobility has commenced. Therefore, the operational mode of the unit 105 may stay or be set to function as a location beacon.

Furthermore, if the device returns to a known location, the operational mode of the device may be configured to immediately transition to a location beacon operational mode. Such location information may be retrieved from a network or server 209. Alternatively, the location information or history may be stored in memory unit 205. It should also be appreciated that location history information may be retrieved from a compiled mapping for surrounding devices. The compiled mapping may be established or updated by ongoing location estimations.

It should further be appreciated that the device itself may have knowledge as to whether or not the device has an accurate estimation of its own location. For example, the device may comprise sensor technology such as accelerometers and gyroscopes, etc. Thus, the device may have knowledge of when its sensor technology may need to be recalibrated and is therefore no longer providing accurate location estimations. In the instance that the device is no longer providing accurate location estimations, the operational mode of the device may be transitioned to a client device.

Once it has been determined that the device is providing accurate location estimations and the operational mode of the device is set to function as a location beacon, the device may thereafter monitor if location request signals from a client device have been received (305). Location request signals may provide an indication that a client device is attempting to estimate its location with the aid of a location beacon.

If a location request signal has not been received, the location estimation unit 105 functioning as a location beacon may proactively broadcast a plurality of location estimation signals (309). The plurality of location estimation signals may be sent at different power levels. Thus, each location estimation signal may comprise information regarding the identification of the device sending the signal, the power level at which the signal was broadcast, and/or the maximum transmission range associated with the respective power level. It some example embodiments, the identification of the device sending the signal may comprise the location of the device.

It should be appreciated that when functioning as a location beacon, the location estimation unit 105 may be configured to send the plurality of signals based on a signaling mode. For instance, the broadcasting of signals may drain the battery power of the device. Thus, the signaling mode may be set to periodic when the device is connected to an external power supply. For example, during a periodic signaling mode, the device may be configured to broadcast the estimation signals during a regular time interval (e.g., once every hour or half hour).

If the device is not connected to an external power supply, the signaling mode may be set to intermittent. During an intermittent signaling mode, the location estimation unit may be configured to broadcast the location estimation signals during a larger time interval (e.g., once every 3 to 4 hours).

It should be noted that the signaling mode of a location beacon may be periodic, intermittent, or on demand irrespective of its power supply.

If a location request signal has been received, the location estimation unit 105 in the location beacon operational mode may thereafter broadcast echo signals, regardless of whether the unit 105 is in a periodic or intermittent signaling mode (307). An echo signal may be a retransmission of a received location request signal from a client device.

When broadcasting echo signals, each signal may comprise information regarding the identification of the location beacon and/or the requesting client device, as well as the power level and/or associated maximum range of the received location request signal. It should be appreciated that the identification may comprise a location of the location beacon and/or an estimated location of the client device. An explanation of location request signals may be provided later on in relation to the client device operational mode.

Upon transmitting the echo and/or location estimation signals, the location beacon unit 105 may continue to monitor the accuracy of its location (301).

Location Estimation Unit as a Client Device

If it is determined that the location estimation unit 105 is associated with a device that does not have an accurate location estimation, the location estimation unit 105 may transition to or maintain a client device operational mode (311). In the determination of transitioning to or maintaining a client device operational mode, the location estimation unit 105 may monitor the mobility of a device. For example, if a device has moved beyond a predetermined threshold range (e.g., 1 meter from its original position), a client device operational mode may be evoked.

Once a client device operational mode has been established, a determination of a client device estimation mode may be made (313). In some example embodiments, the client device estimation unit 105 may be configured to estimate in an active or passive mode.

If the client device estimation unit 105 is estimating in an active mode, the location estimation unit 105 may be configured to broadcast a plurality of location request signals (315). Each location request signal may comprise information regarding the identification of the device sending the signal, the power level at which the signal was broadcast, and/or the maximum transmission range associated with the respective power level. It should be appreciated that the identification of the device sending the signal may also comprise an estimated location of the device. A location beacon may receive the location request signals and thereafter send an echo signal of the received transmission, as discussed above.

The client device may thereafter receive the transmitted echo signals from the location beacon (317). Upon receiving the echo signals, the client device location estimation unit 105 may thereafter estimate the location of the client device based on an evaluation of the transmitted location request signals and the received echo signals (319).

It should be appreciated that the client device may be passively estimating its location. During a passive mode of estimation, the client device location estimation unit 105 may be configured to listen for a broadcast of location estimation signals that may be sent by a nearby location beacon, as discussed above (321). Thereafter, the client device location estimation unit 105 may be configured to estimate its location based on the received signals (323). It should also be appreciated that the client device may transition from a passive and active mode of estimation (and vice versa) at any time.

Upon transmitting the echo and/or location estimation signals, the client device unit 105 may continue to monitor the accuracy of its location (301).

Operational Transitions

It should be appreciated that the location estimation unit 105 may be configured to continuously transition back and forth from client device and location beacon modes of operation. In some example embodiments, once a device has transitioned to a location beacon operational mode, the device may register itself on a network server 209 as a location beacon and thereafter begin broadcasting its positions as discussed above. If the device transitions to a client device operational mode, the device may deregister itself from a network server and begin estimating its new location as discussed above.

It should also be appreciated that devices utilizing the location estimation unit 105 may also be configured to transition to and from different types of technologies. For example, if a building comprises a Wi-Fi positioning system, a device utilizing the estimation unit 105 may function as a location beacon using BLUETOOTH® wireless technology which may result in less power consumption.

The transitional operation allows for the use of dynamic beacons and beacon estimation ranges. The dynamic nature of the estimation system may increase the density of beacons in a coverage area thereby decreasing the amount of power needed by an individual beacon. Individual beacons may utilize less power since individual beacons may cover a smaller range due to the increased density of location beacon, and therefore provide better precision. Furthermore, it should be appreciated that operational transitions may also extend the coverage area of the beacon system by including more beacons in the outer areas of the coverage area.

Working Example

Figure 4A:
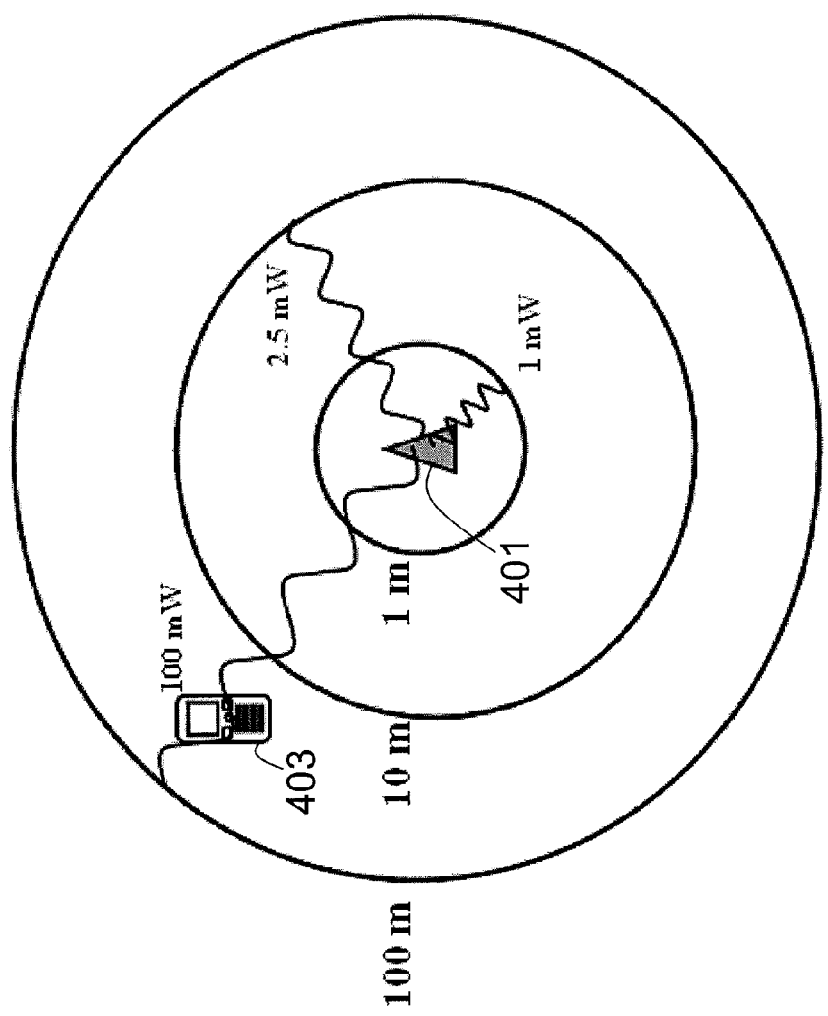
FIGS. 4A and 4B provide an illustrative example of a location estimation process, according to some of the example embodiments presented herein.
Figure 4B:
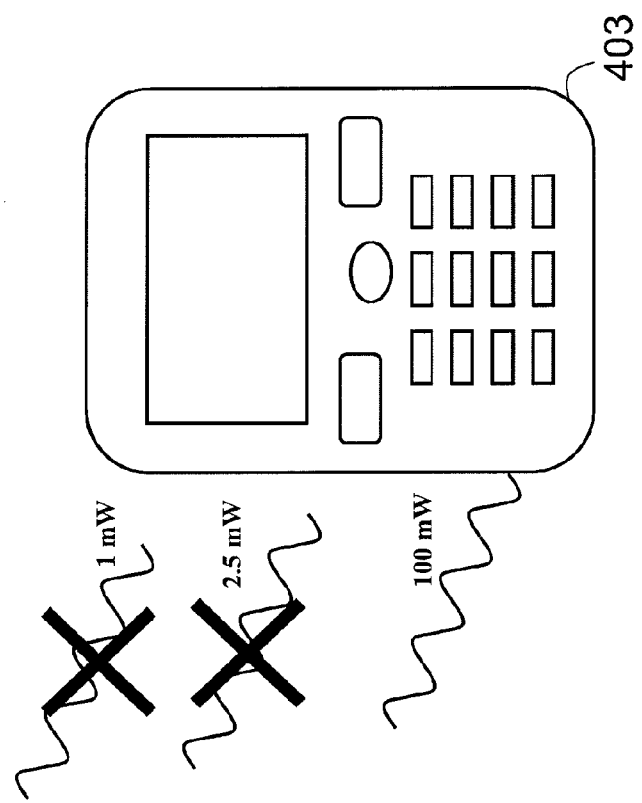

FIGS. 4A and 4B illustrate a working example of some of the embodiments described herein. In the example provided, devices 401 and 403 comprise a location estimating unit 105 as described above. The estimating unit of device 401 is in a location beacon operational mode, while the estimating unit of device 403 is in a client device operational mode.

Assuming the location beacon 401 has not received a location request signal, the location beacon 401 may broadcast a plurality of location estimation signals (309). In the example provided, the location estimation signals are transmitted by the estimation unit in the location beacon operational mode. The first transmitted signal is sent with a power level of 1 mW. Thus, the first transmitted signal may comprise the following information, (1) the identification and/or location of the location beacon transmitting the signal, (2) the power level of the transmitted signal (e.g., 1 mW), and/or (3) the maximum transmission range associated with the transmitted power level (e.g., 1 meter). The second transmitted signal may comprise the following information: identification and/or location of the location beacon; power level=2.5 mW; and/or maximum transmission range=10 meters. Similarly, the third transmitted signal may comprise the following information: identification and/or location of the location beacon; power level=100 mW; and/or maximum transmission range=100 meters.

Assuming the client device 403 is in a passive estimation mode, the client device 403 may be configured to listen for any estimation signals broadcast by a location beacon (321). As illustrated in the example provided in FIGS. 4A and 4B, due to the location of the location beacon 401 and client device 403, the client device 403 is only able to receive the third estimation signal at 100 mW in the range of 100 meters. Thus, from this information the estimation unit 105 of the client device 403 may estimate that its location must be within 100 meters of the location beacon (323).

It should be appreciated that had the client device 403 been in an active mode of estimation, the client device may be configured to broadcast location request signals, where the signals may include an estimated position of the client device (315). Assuming the same three signals were broadcast from the client device 403 (e.g., the 1 mW, 2.5 mW, and 100 mW signals), the location beacon 401 would only be able to receive the 100 mW signal due to its location. Upon receiving the 100 mW location broadcast signal, the location beacon 401 may thereafter send an echo signal (307). Once receiving the transmitted echo signal (317) the client device may estimate its location based on the transmitted location request signals and the echo signal (319). Specifically, the client device 403 knows which location request signals were transmitted. Therefore, if the client device 403 only receives a 100 mW echo signal, the client device will have knowledge that the location beacon was only able to receive the 100 mW location request signal. Thus, in the example provided the client device 403 would estimate its location to be less than or equal to 100 meters (since the 100 mW signal was received by the location beacon) and greater than 10 meters (since the 2.5 mW and 1 mW signals were not received by the location beacon).

CONCLUSION

Example embodiments have been presented herein which provide a location estimation unit that may be operable in at least two states (i.e., a client device and location beacon operational mode). The ability to transition from and to a client device and location beacon provides dynamic beacon ranges. Having dynamic beacon ranges may improve the accuracy and speed of the estimation process. Furthermore, the range in which estimations may be made may also increase.

Some example embodiments may comprise a portable or non-portable telephone, media player, Personal Communications System (PCS) terminal, Personal Data Assistant (PDA), laptop computer, palmtop receiver, camera, television, radar and/or any appliance that comprises a transducer designed to transmit and/or receive radio, television, microwave, telephone and/or radar signals. The device according to the example embodiments is however intended for use particularly, but not exclusively for high frequency radio equipment.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for location estimation comprising:
   broadcasting, from a client device, a plurality of location request signals, each location request signal having a different transmission power level, the respective location request signal comprising an identification of the client device and an identification of a transmission power level at which the location request signal was broadcasted or an identification of a maximum transmission range associated with the transmission power level;
   receiving, at a location beacon, at least one of the broadcasted location request signals
   upon receiving a location request signal, transmitting, from the location beacon, a broadcasting response signal, wherein the broadcasting response signal comprises a location of the location beacon, the identification of the client device, and the identification of the transmission power level at which the location request signal was broadcasted or the identification of the maximum transmission range associated with the transmission power level, wherein the broadcasting response signal is broadcasted using the transmission power level identified in the received location request signal or is broadcasted such that the maximum transmission range of the broadcasting response signal corresponds to the maximum transmission range identified in the received location request signal;
   receiving at the client device the transmitted broadcasting response signal; and
   estimating a current location of the client device based on the received broadcasting response signal.

2. The method of claim 1 further comprising:
   transitioning an operational mode of the client device such that the client device will function as a location beacon once the estimated current location of the client device has reached a predetermined level of accuracy.

3. The method of claim 2 further comprising determining the predetermined level of accuracy based on at least one of a period of non-mobility, a type of power source, or a known location.

4. The method of claim 1 wherein at least one of the steps of transmitting, receiving, and estimating take place in an indoor environment.

5. The method of claim 1 further comprising compiling or updating a mapping of at least one surrounding device as a function of the estimated current location.

6. A non-transitory computer readable storage medium encoded with computer executable instructions, wherein the instructions, when executed by a location beacon device, perform the method of claim 1.

7. A location beacon comprising:
   a receiver configured to receive a location request signal transmitted from a client device, wherein the location request signal comprises an identification of the client device and an identification of a transmission power level at which the location request signal was broadcasted or an identification of a maximum transmission range associated with the transmission power level;
   a transmitter configured to broadcast a broadcasting response signal wherein the broadcasting response signal comprises a location of the location beacon, the identification of the client device, and the identification of the transmission power level at which the location request signal was broadcasted or the identification of the maximum transmission range associated with the transmission power level, wherein the transmitter is further configured to broadcast the broadcasting response signal using the transmission power level identified in the received location request signal or to broadcast the broadcasting response signal such that the maximum transmission range of the broadcasting response signal corresponds to the maximum transmission range identified in the received location request signal.

8. A location estimation unit arranged in a client device, the local estimation unit comprising:
   a receiver configured to receive at least one location signal from a location beacon, wherein each of the at least one location signal comprises a location of the location beacon and an identification of a transmission power level at which the location request signal was broadcasted or an identification of a maximum transmission range associated with the transmission power level; and
   an estimator configured to estimate a current location based on the received at least one location signal and the transmission power level or maximum transmission range included in the received at least one location signal,
   wherein the location estimation unit is further configured to transition to a location beacon operational mode from a client device operational mode when the location unit gas reached a predetermined level of accuracy,
   wherein the location estimation unit is further configured to determine the predetermined level of accuracy based or a type of power source.

9. The unit of claim 8 wherein the unit is further configured to determine the predetermined level of accuracy based on a period of non-mobility or a known location.

10. The unit of claim 8 wherein the location unit is in an indoor environment.

11. The unit of claim 8 wherein the estimator is configured to create a mapping of at least one surrounding device as a function of the estimated current location.

12. The unit of claim 8 wherein the unit is a component of a BLUETOOTH wireless device or Wi-Fi device.

13. The unit of claim 8 wherein the unit is a component of a multimedia device.

14. The unit of claim 8 wherein the unit is a component of a mobile phone or computer.

* * * * *